United States Patent [19]
Wilson

[11] 3,934,900
[45] Jan. 27, 1976

[54] FENDER AND SPLASH GUARD

[76] Inventor: Robert E. Wilson, 3002 Melvin, Rochester, Mich. 48063

[22] Filed: Sept. 23, 1974

[21] Appl. No.: 508,048

[52] U.S. Cl. .............................................. 280/152.3
[51] Int. Cl.² ................................................ B62B 9/16
[58] Field of Search .......... 280/152 R, 152.1, 152.2, 280/152.3, 154.5 R, 154.5 A

[56] References Cited
UNITED STATES PATENTS

| | | | |
|---|---|---|---|
| 544,935 | 8/1895 | Shone ............................... | 280/152.3 |
| 1,713,405 | 5/1929 | Stansfeld ......................... | 280/152 R |
| 1,807,044 | 5/1931 | Merrilies ......................... | 280/152 R |
| 1,855,761 | 4/1932 | Hughes ............................ | 280/152 R |
| 1,916,099 | 6/1933 | Dubonnet ........................ | 280/152 R |

FOREIGN PATENTS OR APPLICATIONS 347,820  5/1931  United Kingdom ............. 280/152 R

*Primary Examiner*—Leo Friaglia
*Assistant Examiner*—Michael J. Forman
*Attorney, Agent, or Firm*—Hugh L. Fisher

[57] ABSTRACT

A combined fender and splash guard for a motorcycle comprises a single member injection molded of polypropylene and has a main fender portion and at least one splash guard integrally formed with the fender. The fender and splash guard can be doubled back on itself in a collision or spill without damage. Means are provided to attach the fender and integral splash guard to the motorcycle.

7 Claims, 10 Drawing Figures

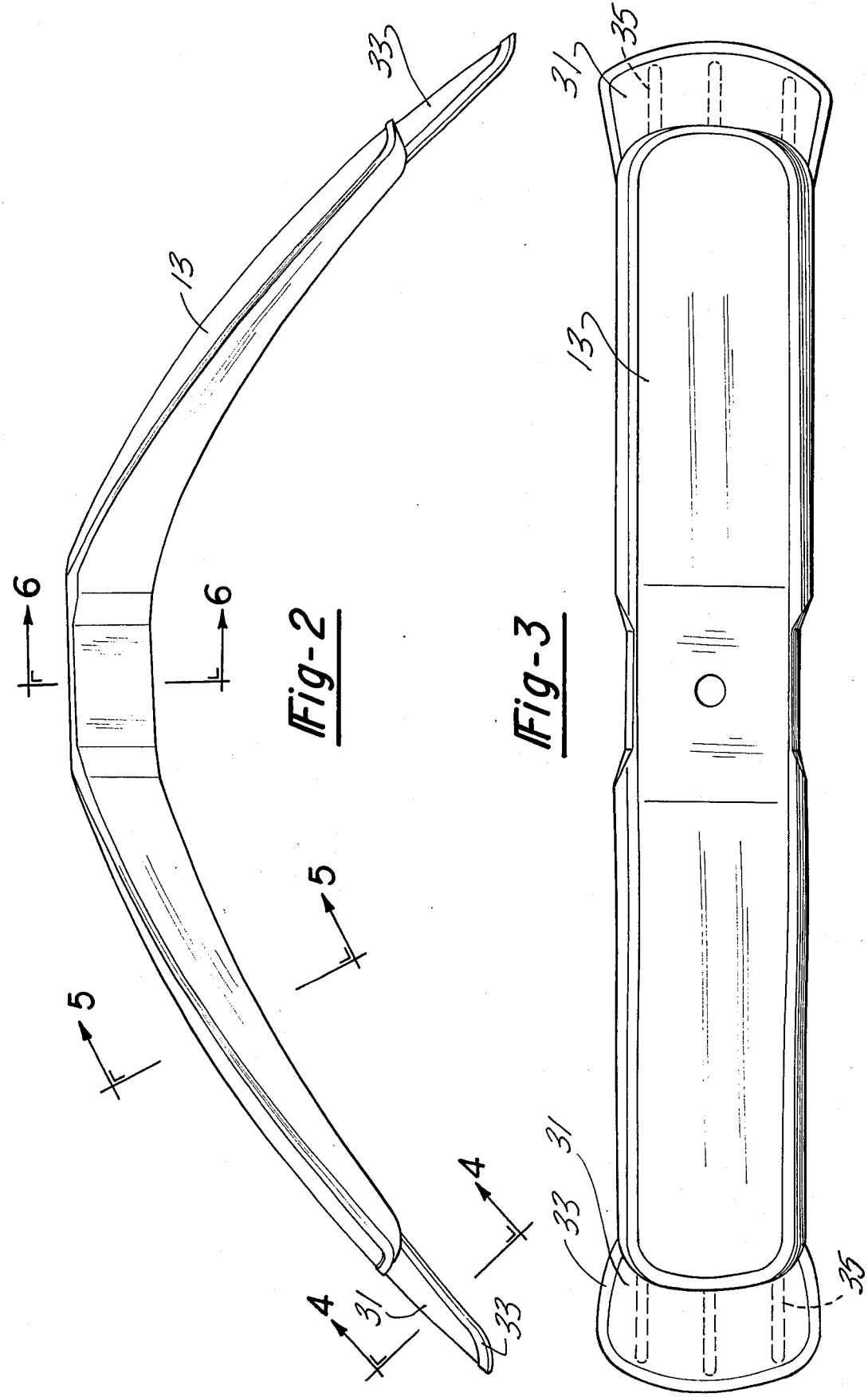

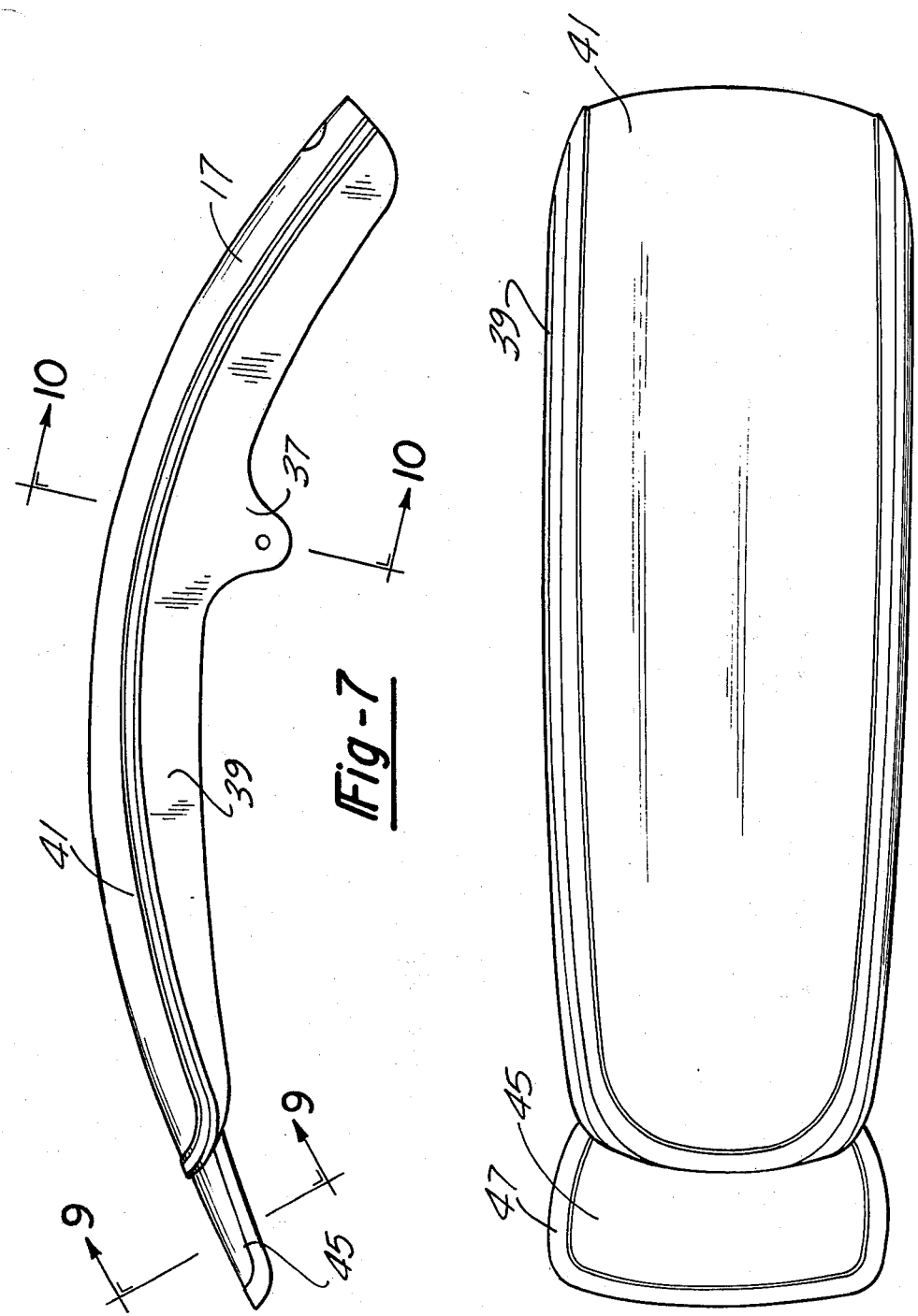

FENDER AND SPLASH GUARD

This invention relates to fender and splash guards for wheeled vehicles and more particularly to integral fender and splash guard units for two wheeled vehicles.

It is the usual practice to provide two wheeled vehicles such as motorcycles with fenders for each wheel and separate splash guards or mud flaps attached to the fenders for preventing dirt and water spinning off the wheel, etc, from being thrown backward from the fender and instead, directing such material being thrown tangentially from the wheel towards the ground. Such splash guards or flaps must be attached by some method to the fender. The guard must at the same time be flexible so as not to be damaged by hitting an object and also to not sail or be blown upward to an ineffective position.

Where the vehicle is operated under conditions where there are constant violent collisions and spills, the fender and splash guard combination must at the same time be flexible enough to allow substantial distortion without damage and yet strong enough to resist damage by foreign objects such as rocks, etc.

It is therefore an object of the invention to provide a single piece molded fender and splash guard assembly that will provide the desired functions of separate fenders and splash guards.

Another object is to provide a single molded assembly that is inexpensive to manufacturer and yet has the appearance and functional strength of a more expensive metal fender and rubber splash guard attached thereto.

Still another object is to provide a fender and splash guard combination that can be doubled back on itself without damages.

Other objects and advantages will be readily apparent to those skilled in the art from the following description and accompanying drawings in which:

FIG. 2 is an enlarged elevational view of the front fender and splash guard combination;

FIG. 3 is a plan view of the fender and guard assembly of FIG. 2;

FIG. 7 is an enlarged elevational view of the rear fender and splash guard combination;

FIG. 8 is a plan view of the fender and guard assembly of FIG. 7;

Figure 1:
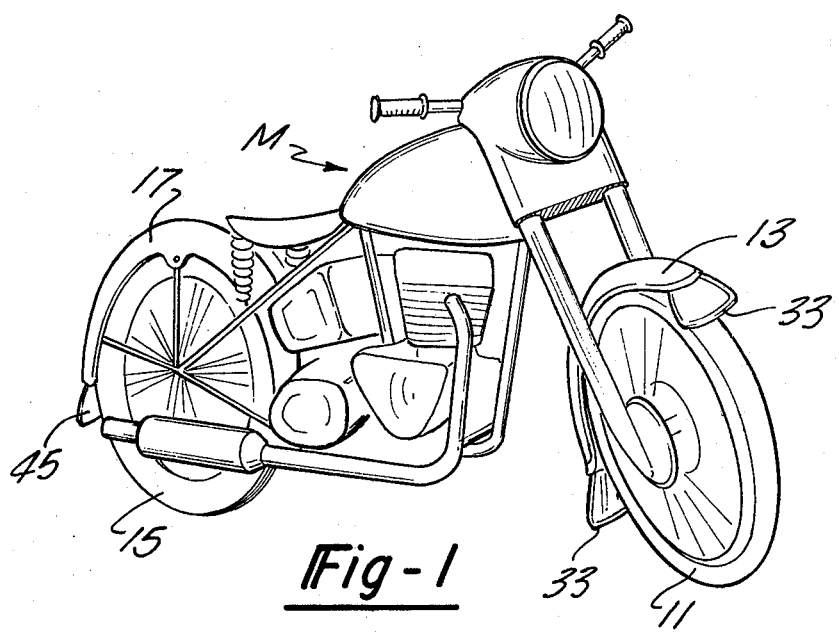
FIG. 1 is an elevational view of a two wheeled vehicle having fenders made in accord with the invention.
Figure 4:
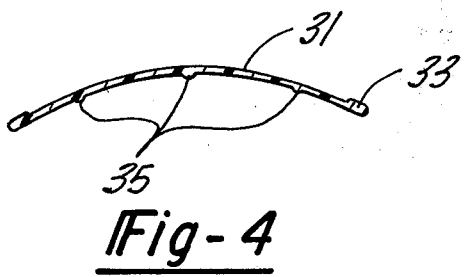
FIG. 4 is a sectional view taken on the line 4—4 of FIG. 2 through the splash guard portion.
Figure 10:
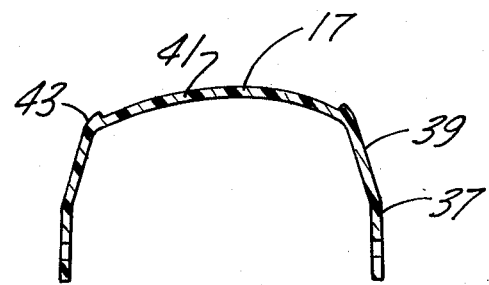
FIG. 10 is a sectional view taken on the line 10—10 of FIG. 7.

Referring now to FIG. 1 which shows the invention applied to two different fender and splash guard constructions. A conventional motorcycle having a front wheel 11 protected by a front fender and splash guard 13 and a rear wheel 15 protected by a rear fender and splash guard 17.

The combined fender and splash guards 13 and 17 are each formed by injection molding a single piece out of high impact plastic. It has been found that certain elastic polymers, particularly polypropylene material such as EXXON 808HC polypropylene will have the combined impact resistance, strength and high softening temperature that will satisfy the object of the invention. Fender and splash guards made with this material can be doubled back upon themselves during a collision of the vehicle or spill and return to their original shape without damage or permanent distortion. The fenders have a configuration designed both for strength and durability and for appearance. Where fenders are used on off the road vehicles such as trail bikes, the resistance to vibrational fatigue, resistance to damage by impact of objects such as rocks, trees is especially important. By molding the fender and splash guard or mud guard in one piece the necessity of providing separate mounting of the splash guard on the fender with the accompanying cost and corrosion prone fastenings is eliminated. In addition it is possible to mold the device in any number of different colors with no paint or other coating necessary for the fender and splash guard combination.

Figure 6:
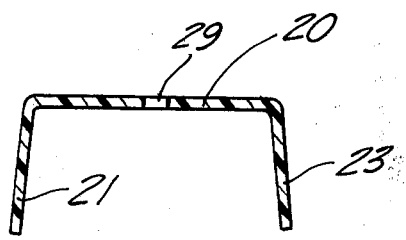
FIG. 6 is still another sectional view taken on the line 6—6 of FIG. 2 through the center portion of the fender of FIG. 2.
Figure 9:
FIG. 9 is a sectional view taken on the line 9—9 of FIG. 7 through the splash guard portion of the fender of FIG. 7.
Figure 5:
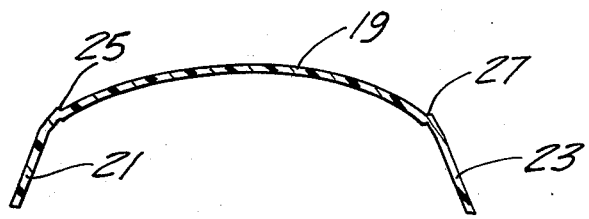
FIG. 5 is another sectional view taken on the line 5—5 of FIG. 2 through an intermediate portion of the fender of FIG. 2.

The front fender will be described first, and referring to FIGS. 2 to 6, it will be seen that there is a main arcuate fender portion having a variable cross section. As seen in FIGS. 5 and 6 the rear fender portion includes a central curved portion 19 that is flattened at the longitudinal center 20 as seen in FIG. 6. Straight skirt side sections 21 and 23 depend from the sides of the center portion. The junctures 25 and 27 of the center and side portions forms a ridge that extends around the opposite ends of the fender portion and provides rigidity to the fender and at the same time provides an ornamental appearance. At the center of the flattened portion is a hole 29 for a fastener to attach the unit to the vehicle.

At the ends of the fender portion are continuation splash guard portions 31. As seen in FIG. 3 these flare outwardly to provide an effective shield to prevent mud, stones, etc., thrown from the wheel 15 to be thrown backward or forward but instead deflects the same downward toward the ground.

The splash guards comprise only a single curved section with a thickened edge 33 serving to increase the strength and improve the appearance of the guard. On the inner concave side of the splash guards there can be formed longitudenal ridges 35 that can aid in removing the unit from the injection mold. The outer convex surface of the splash guard is disposed below the level of the outer convex surface of the fender portion and the ridge formed by the junctures 25 and 27 and gives the appearance of a separate fender and splash guard although the parts are integral.

The rear fender 17 is similar to the front fender with some exceptions. A pair of mounting lugs 37 extend from the skirt or side portions 39 and are used to attach the rear fender to the motorcycle. The straight side portions 39 depend from the center arcuate section 41 and at the juncture there is formed a ridge 43 similar to the ridge 27 on the front fender.

A single splash guard portion 45 tangentially extends from the rear of the fender portion and has an increased thickness edge 47 similar to the edge 33 of the splash guards on the front fender. It will be seen that I have provided a fender and splash guard assembly that is easy to manufacture, needs no maintenance, is practically industructable and has a pleasing appearance. Changes and modifications may be made by those skilled in the art without departing from the spirit of the invention and such changes and modifications are deemed to be within the scope of the invention which is limited only by the following claims:

I claim:

1. A high strength fender and splash guard combination unit for vehicle wheel and tire assembly, said unit comprises a single piece molded of resilient polypropylene material and including a main arcuate fender portion having a cross section including a central curved section and depending side sections joined to the sides of the curved section to form a relatively sharp angled juncture portion, and an integral splash guard portion extending tangentially from one end of the main arcuate portion, said splash guard portion having a cross section comprising an arcuate generally conforming to the shape of the central curved section of the main fender portion, and attaching means in said arcuate fender portion for mounting said unit on a vehicle.

2. The fender and splash guard unit of claim 1 wherein said attaching means are integrally formed on the fender portion to permit attaching of the unit on a vehicle.

3. The fender and splash guard unit of claim 1 wherein the juncture between the side and central sections of the fender comprises an increased thickness ridge section forming the sharp angle to simultaneously provide rigidity for the unit and ornamental appearance to the same.

4. The fender and splash guard unit of claim 3 wherein said splash guard portion has an increased thickness periphery forming a ridge providing rigidity and ornamental appearance to the splash guard portion.

5. The fender and splash guard unit of claim 1 wherein said fender portion has a transverse arcuate section forming an outer convex surface, said splash guard having a transverse section forming an outer convex surface, said fender portion and splash guard being integral to each other with said convex surface of said splash guard being disposed radially inwardly of said convex surface portion of the arcuate fender portion.

6. The fender and splash guard unit of claim 1 wherein said juncture portion affords rigidity to said unit independently of said attaching means and wherein said resilient material enables a folding back of said unit along itself without damage.

7. A high strength combination fender and splash guard unit for a vehicle wheel and tire assembly comprising a main curved fender portion concentric with the axis of rotation of the wheel, said curved portion having a cross section including a central arcuate section concentric with the toroidal axis of the tire and a straight flange section extending radially inward from the side of the center section, the juncture of the central and side sections forming a sharp edge and providing a relatively rigid section resisting radial flexing of the fender, a splash guard portion integral with and extending tangentially from one rounded end of the fender portion, said splash guard portion having a curved cross section generally conforming to the shape of the central curved section of the fender portion, the juncture of the fender portion and splash guard portion forming a sharp edge contiguous with the edges between the fender central portion and side portions to provide a relatively rigid lateral section resisting lateral flexing of the fender, fender mounting means comprising a pair of attaching lugs radially extending from the fender side portions; said unit having a combined flexibility and strength such that bending the fender back upon itself in a collision or spill of the vehicle will not cause damage to the unit.

* * * * *

UNITED STATES PATENT OFFICE
CERTIFICATE OF CORRECTION

Patent No. 3,934,900  Dated January 27, 1976

Inventor(s) Robert E. Wilson

It is certified that error appears in the above-identified patent and that said Letters Patent are hereby corrected as shown below:

Column 3, claim 1, line 18, after "arcuate" insert --section--.

Signed and Sealed this

Third Day of August 1976

[SEAL]

Attest:

RUTH C. MASON
Attesting Officer

C. MARSHALL DANN
Commissioner of Patents and Trademarks